United States Patent [19]
West

[11] 3,930,547
[45] Jan. 6, 1976

[54] SNOW VEHICLE SUSPENSION SYSTEM

[75] Inventor: Burke A. West, Monroe, Mich.

[73] Assignee: Monroe Auto Equipment Company, Monroe, Mich.

[22] Filed: Sept. 10, 1970

[21] Appl. No.: 71,088

[52] U.S. Cl. ............................ 180/5 R; 280/21 R
[51] Int. Cl.² ........................................ B62M 27/00
[58] Field of Search ...................... 180/3–6; 280/8, 9, 10, 11–14, 21; 267/31, 52, 54, 49

[56] References Cited
UNITED STATES PATENTS

| | | | |
|---|---|---|---|
| 1,544,169 | 6/1925 | Orwig | 267/52 |
| 3,613,812 | 10/1971 | Heteen | 180/5 R |

*Primary Examiner*—Philip Goodman
*Attorney, Agent, or Firm*—Harness, Dickey & Pierce

[57] ABSTRACT

A suspension system for snow vehicles of the type comprising a pair of steerable skis which are attached to the forward end of the vehicle by means of leaf springs, the suspension system including a pair of direct acting, telescopic shock absorbers cooperable with the leaf spring assemblies and operatively connected thereto by pairs of adaptor or attachment bracket assemblies that permit the shock absorbers to be conveniently surmounted directly above the respective leaf spring assemblies without interfering with either the mounting means therefor or the steering shafts of the vehicle, whereby the shock absorbers may cooperate with the leaf spring assemblies in damping impact forces and providing for better steering and a more safe, stable and controlled ride as the vehicle traverses relatively irregular or rough terrain.

6 Claims, 5 Drawing Figures

U.S. Patent  Jan. 6, 1976  3,930,547
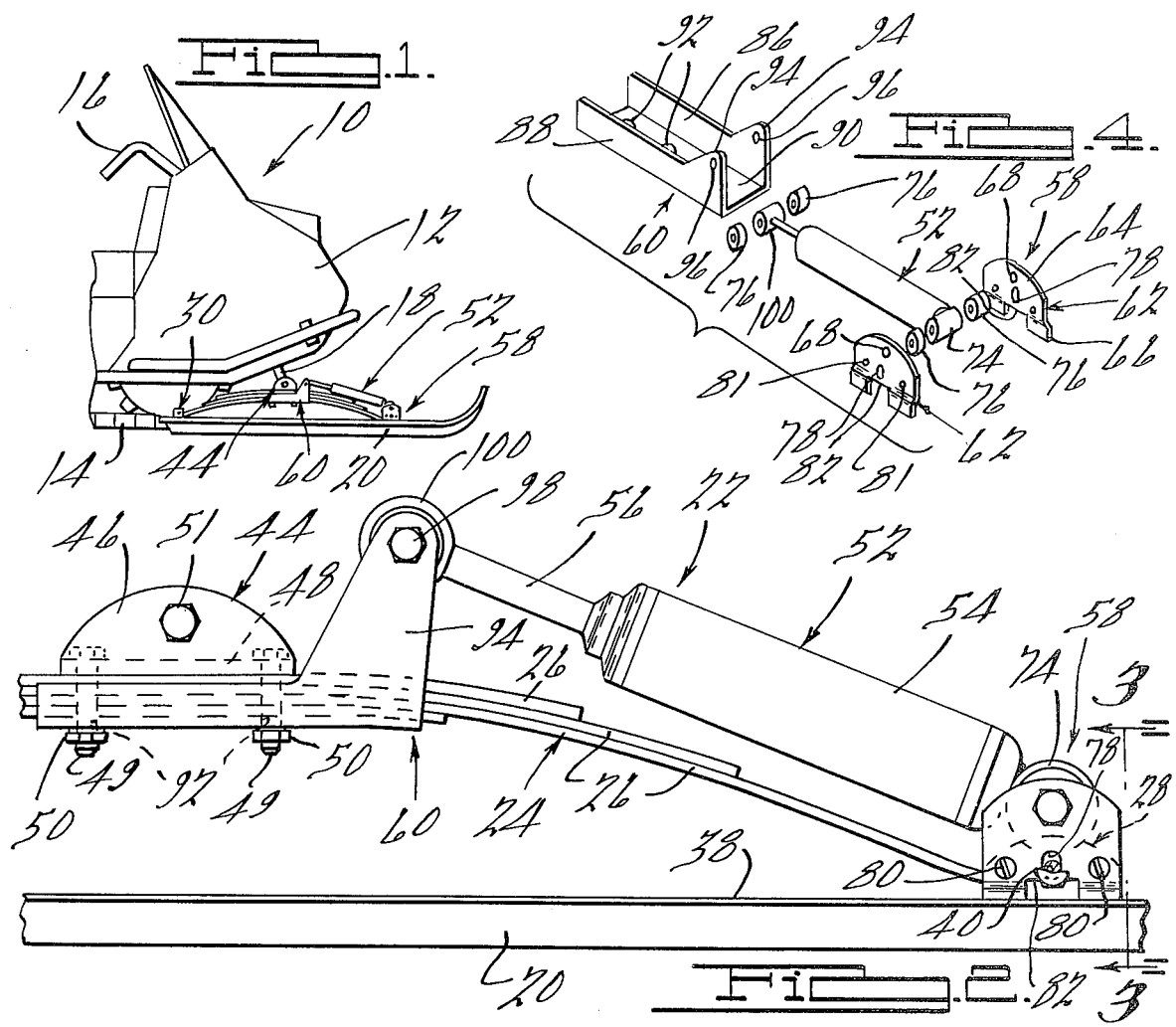
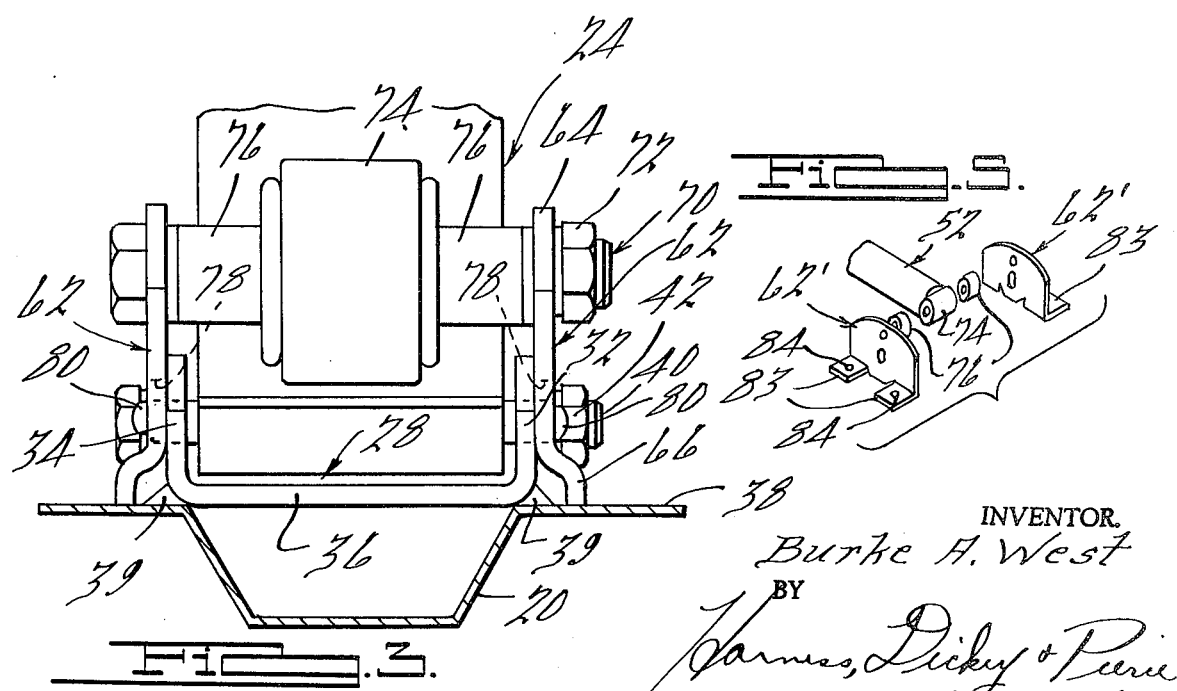
INVENTOR.
Burke A. West
BY
James, Dickey & Pierce
ATTORNEYS.

SNOW VEHICLE SUSPENSION SYSTEM

BACKGROUND OF THE INVENTION

It has become conventional to provide snow vehicles, of the type commonly referred to as snowmobiles, with a pair of parallel, laterally spaced, steerable skis which are mounted at the forward end of the vehicles. Skis have conventionally been provided with longitudinally extending leaf springs that function in a ride cushioning capacity as the vehicles traverse irregular terrain. The relative stiffness of the leaf springs and their rate of deflection directly affects and determines the ride characteristics of the vehicle, and the manner in which the springs undergo compression and rebound from shock loads affects not only the ride but also the steerability and control of the vehicles in use. By virtue of the fact that snowmobiles are designed and intended to travel cross country over relatively rough terrain, frequently at high speeds, it has been the practice to employ relatively stiff, high rate springs in order to absorb large impact stresses and prevent overstressing the springs under high shock loads. Unfortunately, the use of such relatively stiff springs does not enhance the riding characteristics of snowmobiles and, in fact, has been known to be a factor in occasional loss of control thereof. An additional undesirable characteristic of such leaf springs is that under certain conditions of use, harmonic vibrations develop which result in a rhythmic, pulsating up and down movement of the skis, a phenomena that usually produces a hard, jolting ride and substantially reduces the speed of the vehicles.

In order to overcome the aforementioned undesirable characteristics resulting from the use of leaf springs in snowmobile suspensions, it has heretofore been proposed to provide such leaf springs with direct acting telescopic shock absorbers that function to dampen impact forces against the skis, as well as the resultant rebound, so that there is less tendency for an obstruction to "throw" the vehicle or for harmonic vibrations or motions to develop. As a result, better steering and more controlled ride has been achieved. One objection, however, has arisen from the use of such shock absorbers and this resides primarily in the fact that in order to mount the shock absorbers on the leaf springs, it has been necessary to design specialized mounting brackets which are frequently difficult to install and, to some extent, result in a duplication of manufactured parts since certain shock absorber attachment brackets may be combined with the conventional mounting or saddle brackets of the leaf spring, while in other instances, completely different type brackets or other mounting or attachment means must be employed in order to operatively secure the shock absorbers in place.

SUMMARY OF THE INVENTION

The present invention is intended to overcome the aforementioned problems in connection with the use of direct acting telescopic shock absorbers in snowmobile suspension systems through the provision of a new and improved arrangement wherein the shock absorbers are intended to be operatively secured to their associated leaf springs by means of adaptor mounting brackets which are designed to cooperate with the mounting and attachment means by which the leaf springs are secured to the vehicle skis and steering shafts therefor. More particularly, the adaptor brackets are designed to be surmounted directly on the leaf spring attachment clevises and saddle brackets so as to not in any way interfere with these components, with the result that the shock absorbers may be added or removed after complete assembly of the snow vehicle. The adaptor brackets are designed so as to be of a relatively simple construction so that shock absorbers may be conveniently mounted and dismounted at the option of the snow vehicle operator. With this arrangement, the shock absorbers may be supplied as an "after-market" accessory and may be conveniently mounted at any desired time after manufacture of the snow vehicle. Additionally, due to the fact that the adaptor mounting brackets utilized in the suspension system of the present invention in no way interfere with the existing mounting and attachment means of the snow vehicle skis, a minimum amount of time and effort is required to equip an existing snow vehicle with shock absorbers in order to optimize the riding characteristics thereof.

It is, accordingly, a general object of the present invention to provide a new and improved suspension system for snow vehicles and the like.

It is a more particular object of the present invention to provide a new and improved suspension system for snow vehicles which utilizes telescopic direct acting shock absorbers in conjunction with the standard leaf springs employed on snow vehicles.

It is yet a more particular object of the present invention to provide a new and improved suspension system of the above character wherein the shock absorbers may be operatively secured without interfering in any way with the securing or attachment means by which the leaf springs are secured to the vehicle skis and/or steering mechanism of the snow vehicle.

It is another object of the present invention to provide a new and improved snow vehicle suspension system of the above-described character wherein the telescopic direct acting shock absorbers may be conveniently added and removed, when desired, in an extremely convenient manner.

It is still a further object of the present invention to provide a new and improved shock absorber suspension system of an extremely simple design, which is easy to assemble and economical to commercially manufacture.

It is still a further object of the present invention to provide a new and improved shock absorber suspension system of the above-described type that will find universality of application on various types of snow vehicles.

Other objects and advantages of the present invention will become apparent from the following detailed description taken in conjunction with the accompanying drawing.

BRIEF DESCRIPTION OF THE DRAWING

FIG. 1 is a fragmentary side elevational view of a conventional snow vehicle or snowmobile having the new and improved suspension system of the present invention in operative association therewith;

FIG. 2 is an enlarged side elevational view of the snow vehicle suspension system of the present invention;

FIG. 3 is an enlarged fragmentary cross-sectional view taken substantially along the line 3—3 of FIG. 2;

FIG. 4 is an exploded assembly view of the snow vehicle suspension system of the present invention; and FIG. 5 is an exploded assembly view similar to FIG. 4 and illustrates a slightly modified embodiment of the present invention.

DESCRIPTION OF THE PREFERRED EMBODIMENT

Referring now in detail to the drawing and in particular to FIG. 1 thereof, a snow vehicle is generally designated by the numeral 10 and is shown as comprising an exterior body 12 mounted over a power driven endless belt type of traction drive 14. The vehicle 10 is provided with the usual steering mechanism which includes manually engageable handle bars or the like 16 connected via a suitable steering mechanism (not shown) to a pair of laterally spaced steering spindles 18 that extend downwardly from the body 12 and are connected to a pair of conventional front runners or skis 20. The snow vehicle 10 is provided with a suspension system, generally designated 22, which includes a pair of longitudinally extending leaf springs 24 that are disposed one above each of the skis 20 and are connected one to each of the steering spindles 18, as will hereinafter be described. Although only one steering spindle 18, ski 20 and leaf spring 24 is shown in the drawing, it will be understood that the vehicle 10 normally is provided with two of each of these members which are disposed in side-by-side laterally spaced relation under the front or forward end of the body 12. Additionally, it will be appreciated that the steering spindles 18 are operable in response to movement of the handle bars 16 to effect concomitant steering or pivotal movement of the skis 20 for effecting directional control of the vehicle 10, as is well known in the art.

The leaf spring 24 is shown as comprising a plurality of adjacently oriented overlapping leaf elements 26 which are arranged in a generally arcuate, convex upwardly configuration with the opposite ends of the springs 24 being secured to the associated of the skis 20 by means of forward and rearward mounting clevises, generally designated 28 and 30. It may be noted that in certain type vehicles, the spring 24 may comprise a single spring leaf, as opposed to a plurality thereof. As best seen in FIG. 3, the mounting clevis 28 is shown as being of a generally U-shaped configuration in transverse cross section and comprises a pair of laterally spaced, upwardly projecting side sections 32 and 34 which are interconnected by means of a generally horizontally disposed intermediate or bight portion 36. The rearward mounting clevis 30 may be similar in construction to the forward bracket 28 and, like the bracket 28, is adapted to be fixedly secured to the upper surface 38 of the associated of the skis 20 by means of welding or the like, as indicated at 39. The side sections 32, 34 of the bracket 28 and the corresponding side sections of the rearward bracket 30 are formed with a pair of laterally aligned apertures through which suitable screws, bolts, pins or similar connecting elements 40 extend, the elements 40 being fixedly secured to the brackets 28, 30 by means of suitable fastening means, such as cotter keys or the like, or by conventional nuts or the like 42 in the event the elements 40 are in the form of bolts, as shown herein. The rearward end of each of the longest of the leaf elements 26 is formed with a suitable loop through which the rearward connecting element 40 extends to secure the rearward ends of each of the springs 24 to the associated skis 20. The forward ends of the aforesaid largest spring elements 26 are adapted to be inserted interjacent the lower sides of the forward elements 40 and the upper sides of the bight sections 36 of the clevises 28, with suitable anti-friction slide means being provided on the upper sides of the bight sections 36 to permit relative movement between the springs 24 and clevises 28 during impact loading, as is well known in the art.

The uppermost or intermediate portions of the springs 24 are adapted to be operatively secured to the lower ends of the steering spindles 18, as best seen in FIG. 1. Toward this end, each of the springs 24 is provided with a mounting saddle bracket, generally designated 44. The brackets 44 are generally U-shaped in transverse cross section and comprise laterally spaced upwardly projecting side sections 46 and integral intermediate horizontally disposed bight sections 48 that are adapted to be secured by means of suitable screws, bolts or the like 49 and nuts 50 to the upper sides of the associated springs 24, as is best seen in FIG. 2. As is conventional in the art, the side sections 46 of the saddle brackets 44 are provided with laterally aligned apertures through which a suitable laterally extending bolt or pin 51 extends which is adapted for pivotal connection to the lower end of the associated of the steering spindles 18, thereby operatively securing the associated of the springs 24 and the skis 20 to the respective steering spindles 18.

In accordance with the principles of the present invention, each of the springs 24 is provided with a direct acting, telescopic shock absorber, generally designated by the numeral 52, of the type having a generally elongated cylindrical body 54 that houses a hydraulic piston (not shown) which is attached to one end of a reciprocal piston rod 56 that extends longitudinally from one end of the body 54, as best seen in FIG. 2. It will be appreciated, of course, that various types of shock absorbers may be utilized and that virtually any type that is suitably valved for the purpose at hand may be incorporated. By way of example, a typical shock absorber which will find particularly useful and satisfactory application is shown and described in U.S. Reissue Letters Patent No. 23,421. Further in accordance with the principle of the invention, the shock absorbers 52 are adapted to be operatively secured to the skis 20 and springs 24 in a manner which permits extremely convenient and rapid attachment thereof without requiring disassociation of the mounting clevises 28, 30 or saddle brackets 44 from the springs 24, whereby the shock absorbers 52 may be operatively mounted after assembly of the vehicle 10 and, consequently, may be provided as an after-market accessory "kit." Toward this end, the shock absorbers 52 are operatively attached by means of a pair of adaptor bracket assemblies, generally designated by the numerals 58 and 60, which, as hereinafter will be described, function to operatively secure one end of each of the shock absorbers 52 to the associated forward mounting clevis 28 and the opposite ends of the shock absorbers 52 at a position adjacent the saddle brackets 44.

Referring now in detail to the construction of the bracket assemblies 58, as best seen in FIGS. 2, 3 and 4, each of the assemblies 58 comprises a pair of laterally spaced adaptor plates, generally designated by the numeral 62. The adaptor plates 62 comprise upwardly extending, generally flat or planar sections 64 and lower sections 66 which are offset or displaced laterally outwardly slightly from the plane of the upper sections 64, as best seen in FIG. 3. In operation, the adaptor plates 62 are disposed directly adjacent the laterally outer sides of the side sections 32, 34 of the associated forward mounting clevis 28. The laterally outwardly offset lower sections 66 of the plates permit contiguous engagement of the laterally inner sides of the plates 62 with the laterally outer sides of the clevis 28 since the sections 68 assure against any interference with the "bead" of weld material 39 by which the clevises 28 are fixedly secured to the upper sides of the associated skis 20.

The upper sections 64 of the adaptor plates 62 are formed with aligned laterally disposed apertures 68 through which a suitable laterally extending attachment bolt, screw, pin or the like, generally designated by the numeral 70, extends. The member 70 is preferably provided in the form of a suitable bolt and is provided with a lock nut or the like 72 threadably received on the one end thereof for securing the member 70 in the operative position shown in FIG. 3. The member 70 is adapted to function in operatively securing one end of the associated of the shock absorbers 52 to the assembly 58, and in particular, secure one longitudinal end of the body 54 at a position centrally of the plates 62. More particularly and as best seen in FIG. 2, the shock absorbers 52 are provided with fixedly secured mounting bushings or rings 74 that define central laterally extending apertures (not shown) through which intermediate portions of the members 70 extend, thereby pivotably connecting the adjacent end of the associated of the shock absorbers 52 at a position interjacent the adaptor plates 62. In practice, the lateral widths of the bushings 74 may be so as to extend the entire lateral distance between the laterally inner sides of the adaptor plates 62 when the same are operatively mounted along the sides of the forward mounting clevises 28; however, in certain instances, the lateral widths of the bushings 74 may be somewhat less than the lateral spacing between the plates 62, in which case, suitable annular spacing elements 76 may be provided interjacent the opposite sides of the bushings 74 and the adaptor plates 62. While the particular size of the elements 66 may vary in accordance with the type of shock absorber 52 employed and the lateral width of the forward mounting clevises 28, the elements 76 are selected so as to maintain the bushings 74 and hence the forward end of the associated of the shock absorbers 52 at a position centrally disposed between the adaptor plates 62, as will be apparent.

As best seen in FIGS. 2 and 4, the adaptor plates 62 are formed with a second pair of laterally aligned apertures or bores 78 which, upon orientation of the plates 62 along the opposite sides of the forward mounting clevis 28, are disposed in alignment with the associated element 40 and are adapted to have the element 40 extend laterally therethrough in order to operatively secure the plates 62 in place. It will be noted that for certain applications, the element 40 may serve the sole means of operatively securing the bracket assembly 58 to the forward clevis 28, while in other applications, it may be desirable to utilize ancillary fastening means in the form of suitable screws, bolts or the like 80, which extend through suitable openings 81 in the adaptor plates 62 and are threadably received within suitable bores within the side sections 32, 34 of the clevis 28, whereby to enhance the stability of the assembly 58. Additionally, due to the provision of the laterally offset portions 66 of the plates 62, a central portion of the lower end of each of the plates 62 is preferably notched or cut away, as seen at 82, so that when the elements 40 consist of bolts and associated nuts, the bolts, heads and nuts associated therewith may seat against relatively flat or planar surfaces along the outer sides of the plates 62.

It will be noted that in a preferred form of the present invention, the apertures 78 are of a general oval or elongated shape, with the result that the vertical length thereof is somewhat larger than the horizontal width thereof. The reason for this is that in order to optimize stability of the assemblies 58, it is very desirable to have the lower ends of the plates 62 bear directly against the upper sides of the skis 20. By having the apertures 78 elongated in a vertical direction, the plates 62 may be oriented so as to assure the lower ends thereof are engaged with the upper surfaces of the skis 20, regardless of any variation in the spacing between the skis 20 and the associated connecting element 40.

FIG. 5 illustrates a slightly modified form of the present invention wherein a pair of adaptor plates 62' are depicted for serving the same general function as the aforedescribed plates 62 of the assembly 58. In the embodiment shown in FIG. 5, however, instead of the plate 62' being operatively secured directly to the forward mounting clevis 28 by means of the same element 40 by which the forward end of the associated spring 24 is secured, the plates 62' are each formed with a pair of laterally outwardly extending, generally horizontally disposed, flange or tab sections 83 that are suitably apertured, as seen at 84, to receive mounting screws, bolts or the like (not shown) adapted to be threadably secured to the associated of the skis 20. With the exception of this difference in operatively mounting the plates 62', said plates are intended to function identically to the aforedescribed plates 62 in securing the forward end of the associated shock absorber 52 at a position adjacent the mounting clevis 28. As will be apparent, the plates 62' may or may not be provided with suitable spacers 76, depending upon the particular size and configuration of the bushing 74 operatively associated therewith.

Referring now to the adaptor bracket assemblies 60, as best illustrated in FIGS. 2 and 4, the assemblies 60 are each of generally U-shaped configuration in transverse section and comprise a pair of laterally spaced upwardly projecting side sections 86 and 88 and a generally flat horizontal intermediate or bight section 90 that is integrally connected to the lower ends of the side sections 86, 88. The lateral spacing of the side sections 86, 88 is such that the bracket assemblies 60 may be surmounted beneath the underside of the intermediate portion of the associated springs 24, whereupon assembly of the brackets 60, the side sections 86, 88 thereof are disposed in close proximate relation with the laterally outward sides of the associated springs 24, with the bottom or bight sections 90 thereof being contiguously engaged with the underside of the lower leaf elements 26, as illustrated. The bight sections 90 are each formed with a pair of longitudinally spaced centrally located apertures 92 which are adapted to be aligned with the bolts 49 functioning to operatively secure the saddle brackets 44 to the upper sides of the associated springs 24, with the bolts 49 being adapted to extend downwardly through the apertures 92 and being cooperable with the aforementioned nuts 50 to operatively secure the bracket assemblies 60 in place, as best seen in FIG. 2.

The side sections 86, 88 of the assemblies 60 are formed with upwardly projecting ear portions 94 which extend upwardly from the forward ends thereof and are formed with pairs of laterally aligned apertures 96. The apertures 96 are adapted to receive laterally extending screws, bolts or the like 98 which extend laterally therethrough and also through annular bushing members 100 that are fixedly secured to the rearward ends of the piston rods 56 of the shock absorbers 52, whereby the bushings 100, and hence the rearward ends of the shock absorbers are operatively secured interjacent to ear portions 94, as best seen in FIG. 2. In the event the lateral width of bushings 100 is substantially less than the lateral spacing between the side sections 86, 88 of the brackets 60, suitable spacer elements, such as the elements 76, may be utilized in centrally orienting the members 100 within the brackets 60, as will be apparent.

As the skis 20 move across the ground or terrain under the forward end of the vehicle 10 upon operation of the drive track 14 thereof, the shock or impact loads on either of the skis 20 due to the latter passing over an obstruction are absorbed by the joint action of the springs 24 and shock absorbers 52. The shock absorbers 52 thereby act in concert with the springs 24 to dampen action of the springs 24 so as to prevent the occurrence of critical frequency vibrations which, upon occasion, cause the skis 20 to beat against and to imbed in the snow covering the terrain. An important contributing factor of the shock absorbers resides in the fact that if desired, springs with a lower rate spring can be used without being overstressed. Additionally, of course, is the advantage that the snow vehicle 10 is considerably more easy to control when traveling over relatively rough terrain by virtue of damping characteristics of the shock absorbers 52.

A particularly important feature of the present invention resides in the fact that shock absorbers 52 and adaptor bracket assemblies 58 and 60 associated therewith may be merchandised in the form of a "kit" so that the shock absorbers 52 may be sold as an after-market accessory. The primary reason for this resides in the fact that the adaptor bracket assemblies 58, 60 may be conveniently mounted upon the skis 20 and springs 24 without requiring disassociation of these components and, in fact, requiring only temporary removal of the elements 40 associated with the forward mounting clevises 28 and temporary removal of the nuts 50 on the associated saddle brackets 44. Thus, the present invention provides a novel arrangement by which the shock absorbers 52 may be easily installed or removed from the associated snow vehicle in a minimum amount of time and with a minimum expenditure of effort. Furthermore, by virtue of the particular design of the adaptor brackets 58 and 60, said components may be operatively associated with various available styles and models of snow vehicles, whereby to provide for universality of application; thus, a single shock absorber "adaptor kit" may be utilized on a large number and variety of different types of snow vehicles. Additionally, it will be appreciated that the adaptor bracket assemblies 58, 60, by virtue of their relatively simple design, will minimize manufacturing expenses to the extreme and assure for a long and durable operational life.

While it will be apparent that the preferred embodiments illustrated herein are well calculated to fulfill the objects above stated, it will be appreciated that the present invention is susceptible to modification, variation and change without departing from the scope of the invention.

I claim:

1. In an adaptor kit for mounting a telescopic, direct acting shock absorber having attachment bushings at the opposite ends thereof to the suspension system of a snow vehicle including at least one ski-like element and a leaf spring secured at one portion thereof to the ski by a mounting clevis and secured to another portion thereof by a mounting saddle to the steering system of the vehicle,
   a first adaptor bracket assembly comprising a pair of plate-like members connecting one of said attachment bushings of the shock absorber at a position adjacent said mounting clevis,
   a second adaptor bracket assembly for connecting the other of said attachment bushings of the shock absorber at a position adjacent said mounting saddle, and
   first fastening means securing one end of said shock absorber to said mounting clevis and second fastening means securing said first adaptor bracket to said mounting clevis.

2. The invention as set forth in claim 1 wherein said mounting clevis comprises a pair of side sections and wherein said plate-like members are positionable adjacent the laterally outer sides of said side sections.

3. The invention as set forth in claim 2 wherein said mounting clevis is secured as by welding to the upper surface of said ski, and wherein said plate-like members include laterally offset portions permitting said members to be contiguously engaged with said side sections of said mounting clevis without interference with the weld connection of said mounting clevis to said ski.

4. In an adaptor kit for mounting a telescopic, direct acting shock absorber having attachment bushings at the opposite ends thereof to the suspension system of a snow vehicle including at least one ski-like element and a leaf spring secured at one portion thereof to the ski by a mounting clevis and secured at another portion thereof by a mounting saddle to the steering system of the vehicle,
   a first adaptor bracket assembly connecting one of said attachment bushings of the shock absorber at a position adjacent said mounting clevis, and
   a second adaptor bracket assembly for connecting the other of said attachment bushings of the shock absorber at a position adjacent said mounting saddle,
   said second adaptor bracket assembly comprising a generally U-shaped member including laterally spaced apart side sections and a bight portion extending between said side sections and cooperating therewith to nestingly engage an intermediate portion of said spring, and which includes fastening means securing said mounting saddle adjacent said spring.

5. The invention as set forth in claim 4 wherein said fastening means is operable to secure said mounting saddle to said spring.

6. The invention as set forth in claim 4 which includes a fastening member extending laterally between said side sections and through one of said attachment bushings whereby to secure the said attachment bushing at a position interjacent said side sections.

* * * * *